United States Patent [19]

Broecker et al.

[11] 3,865,753

[45] Feb. 11, 1975

[54] PROCESS FOR THE PREPARATION OF A NICKEL MAGNESIUM ALUMINUM CATALYST

[76] Inventors: Franz Josef Broecker, 20 Otto-Dill-Strasse, 6700 Ludwigshafen; Knut Kaempfer, 12 Achrecht-Duerer-Ring, 6710 Frankenthal; Laslo Marosi, 3 Wilhelm-Busch-Weg, 6720 Speyer; Matthias Schwarzmann, 4 Carl-Bosch Strasse, 6703 Limburgerhof; Bruno Triebskorn, 23 Mohnstrasse, 6700 Ludwigshafen, all of Germany

[22] Filed: June 25, 1973

[21] Appl. No.: 373,012

[52] U.S. Cl............................. 252/466 J, 252/373
[51] Int. Cl............................................. B01j 11/22
[58] Field of Search........................ 252/466 J, 373

[56] References Cited
UNITED STATES PATENTS

| | | | |
|---|---|---|---|
| 3,141,729 | 7/1964 | Clarke et al. | 252/466 J |
| 3,320,182 | 5/1967 | Taylor et al. | 252/466 J |
| 3,394,086 | 7/1968 | Taylor et al. | 252/466 J |
| 3,436,358 | 4/1969 | Thygesen | 252/466 J |
| 3,451,949 | 6/1969 | Topsoe et al. | 252/466 J |
| 3,469,957 | 9/1969 | Percival et al. | 252/466 J |
| 3,791,993 | 2/1974 | Rostrup-Nielsen | 252/466 J |

*Primary Examiner*—Arthur P. Demers
*Attorney, Agent, or Firm*—Johnston, Keil, Thompson & Shurtleff

[57] ABSTRACT

The compound $Ni_5MgAl_2(OH)_{18} \cdot CO_3 \cdot 4H_2O$ is precipitated from an aqueous solution containing salts of nickel, magnesium and aluminum with a carbonate or bicarbonate of an alkali metal. After this catalyst precursor has been dried, calcined and reduced with hydrogen a catalyst can be prepared which is suitable for the cracking of hydrocarbons in the presence of steam. In the steam cracking of hydrocarbons the hydrocarbon and the steam may be reacted to form a gas rich in methane in contact with this catalyst at a preheating temperature of less than 300° C.

2 Claims, No Drawings

PROCESS FOR THE PREPARATION OF A NICKEL MAGNESIUM ALUMINUM CATALYST

The present invention relates to catalysts which have been obtained by drying, calcining and reducing definite compounds of so-called catalyst precursors produced from aqueous solution and the use of these catalysts for the production of gas containing methane by hydrocarbons.

Industrial cracking of hydrocarbons, preferably gaseous hydrocarbons, as for example methane, ethane, propane and butane, into gas containing carbon monoxide and hydrogen (known as synthesis gas) in contact with a nickel catalyst in the presence of steam has been known for a long time. It is generally carried out at a temperature of from 600° to 900°C. This reaction is known as steam reforming.

Hydrocarbons may however also be cracked into a gas rich in methane in contact with a nickel catalyst at a lower temperature. The production of methane-rich gas from hydrocarbons such as ethane, propane, butane or naphtha at low temperatures, in contradistinction to steam reforming, is an exothermic process; this reaction is therefore carried out adiabatically in a shaft kiln whereas the production of synthesis gas by steam reforming is carried out in a tubular reactor.

German Printed Application (DAS) 1,180,481 discloses the conversion of liquid hydrocarbons in the range from 400° to 550° with steam in contact with a supported nickel catalyst into methane-rich gas (having a methane content of more than 50% after drying) known as rich gas, by the maintenance of certain ratios of steam to hydrocarbon during the reaction.

Prior art supported nickel catalysts are proposed quite generally for this process. It has been found however that nickel catalysts known from steam reforming at high temperature are not suitable for cracking hydrocarbons at low temperature because they generally exhibit too little activity since their carrier has been calcined at high temperature to satisfy the requirements of steam reforming.

The catalyst devoid of alkali and containing 15% of nickel on aluminum oxide said to be preferred in the abovementioned Printed Application (cf. column 4, lines 29 to 49) also has little suitability for the process because space velocities of not more then 0.5 kg of hydrocarbon per liter of catalyst are permissible with such a catalyst if on-stream periods of somewhat more than 14 days are to be achieved. Such a method is uneconomical however unless space velocities of from about 1 to 1.5 kg of hydrocarbon per liter of catalyst per hour are possible (see the comparative test in Examples 3 and 4).

In German Printed Application (DAS) No. 1,227,603 by the same Applicant it is stated that the life of the catalyst in the process of U.K. Patent No. 820,257 (the subject-matter of which is equivalent to that in DAS 1,180,481) is rather limited and particularly so when high boiling hydrocarbons of the boiling range of gasoline are to be cracked. In DAS 1,227,603 the Applicant proposes a nickel supported catalyst which, in addition to nickel and aluminum oxide, contains from 0.75 to 8.6% of oxides, hydroxides and carbonates of the alkali metals or alkaline earth metals, including magnesium.

It is stated in column 2 from line 44 and column 3 to line 16 that optimum results are obtained when an alkali, particularly potassium, is used as an addition to the catalyst. In all the Examples potassium compounds are logically used as alkalizing agents. Comparative tests carried out by the Applicant show that cracking hydrocarbons with alkaline earth metals, such as calcium and magnesium, proceeds very unsatisfactorily and comes to a halt after only a short time (cf. Example 3 of the cited DAS).

The obligatory alkalization of nickel catalysts prior to their use for steam cracking particularly of liquid hydrocarbons in the temperature range from 350° to 1,000° (i.e. both for the steam reforming process itself and also for the production of rich gas) is also proposed, independently of the abovementioned Applicant, by ICI in DAS 1,199,427.

In view of this knowledge of the prior art there is therefore no inducement for the average expert to propose catalysts which are free from alkali for cracking hydrocarbons because it is part of the general knowledge that only alkali-containing nickel catalysts are capable of preventing deposition of carbon on the catalyst for viable periods when economically viable conditions (low values of the ratio $[H_2O]/[C]$ are used.

Because of the disclosure in DAS 1,227,603 an expert would be prejudiced against the use of alkali-free nickel catalysts containing magnesium for the production of rich gas because (a) the promoting effect of alkalies as for example potassium has been demonstrated and (b) only a negative result would be expected from the use of magnesium or other alkaline earth metals.

We have now found that contrary to expectation it is possible to prepare a catalyst containing nickel, aluminum and magnesium which is superior in its use for the production of gas containing methane to the prior art catalysts (alkalized catalysts) by starting from specified catalyst precursors in the production of the said catalyst and converting these into the actual catalyst by precipitation, drying, calcination and reduction.

The present invention therefore comprises a catalyst which is characterized by the fact that the compound $Ni_5MgAl_2(OH)_{16} \cdot CO_3 \cdot 4H_2O$ is produced from aqueous solution is converted into the actual catalyst by drying in a temperature range of from 80° to 180° C, calcination in a temperature range of from 350° to 550° C followed by reduction in a stream of hydrogen, the rise in temperatuure from the drying stage to the calcination stage being carried out with a gradient within the range from 1.66° C per minute to 3.33° C per minute.

The invention further comprises the use of this catalyst for the production of a methane-containing and particularly a methane-rich gas by cracking hydrocarbons of two to 30 carbon atoms, corresponding to a boiling point range of from 30° to 300° C, in the presence of steam.

The invention is therefore further characterized by the use of the catalyst for the production of gas containing methane from a hydrocarbon of two to 30 carbon atoms or a mixture of the same, the vaporous hydrocarbon and steam being passed at atmospheric or superatomospheric pressure at a space velocity of from 1 to 2 kg of hydrocarbon per liter of catalyst per hour and at a temperature above 250°C over the catalyst and the catalyst being kept at a temperature within the range from 300° to 450° C by the reaction which takes place.

The reaction in question is exothermic, as already stated above, and may therefore be carried out adiabatically in a shaft furnace provided that the reactants are preheated to an adequately high temperature. When using prior art catalysts this method is generally carried out by preheating the starting materials to above 350° C passing them into the bed of catalyst in such a way that the bed is kept at a temperature within the range from 400° to about 550° C by the reaction which takes place (cf. DAS 1,180,481 and DAS 1,227,603).

The catalysts according to the invention make it possible to carry out the said process adiabatically at much lower temperatures. This means that the starting hydrocarbons do not have to be heated to such a high temperature, perheating to a temperature of only at least 250° C being sufficient. The adiabatic reaction may therefore be carried out in the temperature range from 250° to 550° C, but the process is preferably carried out in the temperature range from 300° to 450° C and particularly from 300° to 400° C. The above statements relate to the preheating temperature of the mixture of hydrocarbons and steam. This is dependent on the feedstock used and may be lower the boiling point of the hydrocarbon mixture is and the higher the proportions of paraffins is in the hydrocarbon mixture.

The equilibrium methane content is known to be strongly dependent on temperature and pressure; it is higher the lower the reaction temperature is and the higher the pressure chosen is.

A gas particularly rich in methane may therefore be produced at the low temperature range of from 300° to 400° C with catalysts according to the invention.

A typical composition of a gas produced at from about 300° to 400° C with a catalyst according to the invention may be given, after drying, as:
methane, about 73%
carbon monoxide, less than 1%
carbon dioxide 23% and
hydrogen 4%
all percentages being by volume.

Catalysts according to the invention may be used in a pressure range of from 10 to 100 atmospheres gauge; pressures within the range from 25 to 85 atmospheres gauge are preferably used.

Hydrocarbons having a higher molecular weight than methane may be used as feedstocks. It is preferred to use mixtures of hydrocarbons having a mean carbon number of $C_2$ to $C_{30}$, corresponding to a boiling point range of from about 30° to 300° C. Hydrocarbons mixtures which consist predominantly of paraffin hydrocarbons are particularly suitable. The proportion of paraffinic hydrocarbons in the mixture should not be less than 70% by volume. Cracking aromatic hydrocarbons and naphthenic hydrocarbons is more difficult than that of paraffin hydrocarbons. It is also possible however to use mixtures of hydrocarbons which contain up to 20% of aromatic and/or naphtenes. The chemical nature of the aromatic or naphthenic hydrocarbon components substantially determines whether they can be cracked.

The feedstock (naphtha) should be desulfurized down to a sulfur content of less than 0.5 ppm because the nickel catalysts of the prior art, as also the catalyst of the invention, do not tolerate higher sulfur contents well for long periods. This poisoning effect is common to all nickel cracking catalysts, so that it is fundamental that the feedstock should be subjected to a stringent desulfurization prior to being fed into the cracking. This desulfurization is common in the prior art and is conventionally carried out with catalysts which are resistant to sulfur.

The space velocity may be 1.0 to 2.5 kg of naphtha per liter of catalyst per hour; it is preferable to use space velocities of from 1.2 to 1.5 kg of naphtha per liter of catalyst per hour in industrial plant. A space velocity of 5 kg of naphtha per liter of catalyst per hour as been used in comparative tests (cf. Example 11) in order to be able to achieve appropriate effects within viable periods. The said space velocity is of no interest in the industrial cracking of liquid hydrocarbons. The catalyst according to the invention is however capable of reliably cracking gasoline fractions having a final boiling point of up to 300° C up to a space velocity of 2 kg of naphtha per liter of catalyst. Higher space velocities than 2 may be used in the case of gasolines of lower final boiling points. Space velocities of up to 3.5 kg of naphtha per liter of catalyst may be used in the cracking of propane or butane. These statements make it clear that the space velocity is dependent on the hydrocarbon used.

The ratio by weight of steam to naphtha should be at least 0.8:1. In steam cracking with the catalyst according to the invention, ratios within the range from 1.0 to 2.0 kg of steam to 1 kg of naphtha are used. The use of higher ratios is not critical, but is ruled out by economical reasons.

It is preferred to use molar to 2-molar aqueous solutions of the nitrates for the production of the catalyst precursor $Ni_5MgAl_2(OH)_{16} \cdot CO_3 \cdot 4H_2O$. The precipitant (alkali metal carbonate) is also preferably used in a molar to 2-molar proportion. Two methods have proved to be suitable for the production of a catalyst precursor of the said composition.

Method 1:

Precipitation of the compound $Ni_5MgAl_2(OH)_{16} \cdot CO_3 \cdot 4H_2O$ is carried out with an alkali metal carbonate (sodium or potassium carbonate or a mixture of the two) at a pH within the range from 7.5 to 10.5, particularly within the range from 8.5 to 9.5. The starting solution is an aqueous solution of the nitrates of the divalent and trivalent metals which has been adjusted to pH 8 with sodium carbonate. The molar ratio of $Me^{2+}:Me^{3+}$ in this solution should be at least more than 1:1 but is preferably within the range from 2.5:1 to 3.5:1. It is particularly suitable to choose a ratio of $Me^{2+}:Me^{3+}$ of 3:1 (stoichiometric); this is equivalent to an atomatic ratio of Ni:Mg:Al of 5:1:2.

The catalyst precursor may be precipitated at a temperature of from 0° to 100° C but the precipitation is preferably carried out within a temperature range of from 50° to 70° C. It is preferred to place 2-molar mixtures of nitrates in a vessel and to produce the catalyst precursor therefrom with 2-molar solutions of alkali metal carbonates. The precipitation is preferably carried out within a temperature range of from 50° to 70° C. It is preferred to place 2-molar mixtures of nitrates in a vessel and to produce the catalyst precursor therefrom with 2-molar solutions of alkali metal carbonates. The precipitate is carefully washed until it is devoid of alkali down to a residual content of less than 0.1% or less than 0.01% based on the dry catalyst precursor. The compounds obtained are dried, calcined and reduced in a stream of hydrogen; they give catalysts which are superior to those of the prior art (cf. in particular Example 11).

Method 2:

Magnesium hydroxide is precipitated as a suspension from a 2-molar aqueous solution of magnesium nitrate at a pH of about 10 with alkali metal carbonate (potassium or sodium carbonate or a mixture of both). After the precipitation of the magnesium as hydroxide has been completed the pH range of the suspension is adjusted to from 7.5 to 8.5. On the said suspension there is then precipitated in the pH range of from 7.5 to 8.5 from an inflowing solution (2-molar) containing nickel and aluminum nitrates with an alkali metal carbonate solution (2-molar) nickel and aluminum in the form of their basic carbonates. The temperatures should be in the range from 0° to 100° C but preferably from 50° to 70° C during this precipitation period. The amorphous precipitate produced is washed until free from alkali, the alkali being removed to a value of less than 0.1% but particularly to a value of less than 0.01% based on the catalyst precursor. The washed amorphous precipitate is converted into a crystalline form by suspending it in water and stirring it for some time at a temperature within the range from 50° to 80° C. After this operation the compound $Ni_5MgAl_2(OH)_{16} \cdot CO_3 \cdot 4H_2O$ can be identified radiographically.

Just as important as the maintenance of specific precipitation conditions such as pH, careful removal of alkali to a value of less than 0.1% or less than 0.01%, are the subsequent treatment stages such as the drying, calcination and also the use of a specific rate of heating up between the drying stage and the calcination stage. The production of the individual alkali-free catalyst precursor, the drying of the same, the defined rise in temperature between drying and subsequent calcination in a specific range of from 1.66° to 3.33° C per minute.

The reduction of the catalyst which follows is generally carried out in a stream of hydrogen at a temperature of from 300° to 500° C and is not critical for the production of the catalyst according to the invention.

Drying of the catalyst precursor is carried out in a narrow temperature range of from 80° to 180° C; the range from 90° to 120° C is particularly preferred. It may take place in the air. Calcination of the dried catalyst precursor is carried out in the temperature range from 350° to 550° C. A temperature range from 380° to 440° C is preferred. From 1 hour to 12 hours is a suitable duration for the calcination of a catalyst precursor. The preferred temperature range for the calcination is from 380° to 440° C at calcination periods of from 3 to 6 hours. The most favorable results are achieved however at from 390° to 410° C at calcination periods of from 3.5 to 4.5 hours (cf. in this context particularly Examples 1, 2 and 5 in the Examples of Application 8, 9 and 10).

The most rapid and definite heating up possible should take place between the drying stage and the calcination stage. The period of heating up from the preferred drying temperature (90° to 120° C) to the range of the preferred calcination temperature (390° to 410° C) should be at least 90 minutes but not more than 3 hours. By calcination gradients for the rise in temperature are within the range from 1.66°C per minute to 3.33°C per minute.

The nickel content of the catalyst may naturally vary within wide limits because it is substantially determined by the stoichiometric ratio of the catalyst precursor. The nickel content of the catalyst after it has been reduced is of the order of from 64 to 70%, preferably 67.5%.

The particularly preferred technical use of the catalyst according to the invention is for the production of gas containing methane, and also for the aftertreatment of rich gas produced by cracking naphtha with the object of preparing natural gas substitute, known as aftermethanization of rich gas. The catalyst according to the invention may be used particularly advantageously both in the cracking stage and in the aftermethanization stages in a multistage process for the production of natural gas substitutes.

The explanation of the special activity of the catalyst obtained from the catalyst precursor $Ni_5MgAl_2(OH)_{16} \cdot CO_3 \cdot 4H_2O$ by drying, calcination and reduction may well be that magnesium spinel ($MgAl_2O_4$) is formed after the catalyst has been put into operation. After the drying and calcination there is evidently present a particularly reactive (high area) mixture of the oxides MgO and $Al_2O_3$ which after calcination followed by reduction of the catalyst is capable of forming spinel. This is very surprising because spinel formation generally does not take place until a temperature far above 1,000° C has been reached.

German Laid-Open Application DOS 1,542,505 discloses nickel impregnated catalysts whose carrier consists substantially of magnesium spinel. U.K. Patent No. 914,423 discloses homogenous nickel catalysts consisting substantially of nickel spinel.

In both cases reaction temperatures of about 1,400° or 1,450° C are used. These highly sintered nickel catalysts based on spinel are particularly suitable for cracking of methane into synthesis gas which is carried out at a temperature of from 600° to 900° C; such catalysts or carriers are however not suitable for the production of methane by steam cracking or hydrocarbons at low temperatures because they exhibit too little activity (cf. in particular Example 5 in which a catalyst prepared from the catalyst precursor according to Example 1 is immediately exposed to temperatures of 600° C). Calcination of the catalyst precursor at these temperatures is disadvantageous according to the statement in Example 10 for use in the steam cracking because the catalyst prepared therefrom (cf. E in Example 10) exhibits inadequate activity after only a fairly short period of operation and therefore uncracked gasoline passes through.

The production of catalysts according to the invention is described in the following Examples 1 and 2. In Example 1 method 1 according to the invention is illustrated and in Example 2 another method for the production of the catalyst precursor. Their use for cracking hydrocarbons for the production of gas containing methane is described in Examples 8 and 9.

Catalysts A and B according to the invention are compared with prior art catalysts according to DAS 1,180,481 ($C_1$ and $C_3$) in Example 11 regarding their behavior in the production of gas containing methane. These tests show impressively that the alkali-free catalysts according to the invention are greatly superior to prior art catalysts in their activity, particularly at high space velocities such as are used industrially at the present time.

Example 11 also shows that the catalysts (A and B) according to the invention are also superior to the prior art alkalized catalysts (cf. G) according to DAS 1,227,603 in all respects. The higher space velocities and the longer life of the catalysts according to the invention as compared with industrially used alkalized nickel catalysts are to be particularly emphasized. When the catalysts are used for the production of gas containing methane this increased activity of the catalyst according to the invention has the advantage that the process can be carried out at much lower temperatures so that in only one stage of the process methane contents in the range of from 65 to 75% by volume can be achieved which can then be converted merely in a further process stage followed by drying and scrubbing out $CO_2$ into gases which can be used as substitutes for natural gas and have specifications as required for this gas (total $H_2 + CO$ maximum 0.1% by volume based on the gas after scrubbing out $CO_2$).

In the production of methane the cracked gas is cooled to below the temperature at the outlet from the reactor after the first catalytic stage in order to condense out excess water; the gas is preferably cooled to a temperature below 100° C, for example to a temperature within the range from 20° to 80° C.

Gas containing oxides of carbon is used as feedstock in the second catalytic stage of the process; the rich gas which may generally contain from 50 to 75% of methane, from 19 to 25% of carbon dioxide, up to 16% of hydrogen and up to 5% of carbon monoxide and which stems from the low temperature cracking of naphtha is particularly suitable. It has been found that this dry gas can be passed into the bed of a nickel catalyst at preheating temperatures of the range from 200° to 300° C without coking of the catalyst. This is surprising because it is claimed in DOS 1,645,840 that aftermethanization of rich gas can only be carried out in the presence of water because the nickel catalyst use for methanization tend to coke in the absence of water.

Space velocities in the range from 2000 to 10,000 liters (STP) of gas per liter of catalyst per hour may be chosen for the second catalytic treatment stage. Lower space velocities are chosen at the higher carbon monoxide contents of the cracked gas and conversely somewhat higher space velocities are used at low carbon monoxide contents of the raw materials. It is preferred to use space velocities of from 3000 to 4000 liters (STP) of gas per liter of catalyst per hour.

The following Examples illustrate the invention.

EXAMPLE 1

Catalyst A:

The 2-molar solutions 1 and 2 hereinafter described are used for the pricipitation of the catalyst precursor $Ni_5MgAl_2(OH)_{16}CO_3 \cdot 4HO$:

Solution 1:
  3.345 kg of $Ni(NO_3)_2 \cdot 6H_2O$,
  0.588 kg of $Mg(NO_3)_2 \cdot 6H_2O$ and
  1.722 kg of $Al(NO_3)_3 \cdot 9H_2O$
are dissolved in such an amount of water until a solution having a total volume of 9 liters has been obtained.

Solution 2:
  3.06 kg of $K_2CO_3$ is dissolved in 11 liters of water.

2 liters of water is placed in a stirred vessel and heated to 60° C. A glass electrode dips into the vessel for continuous measurement of the pH. The pH in the vessel is adjusted to 9.5 by adding solution 2.

A precipitate is produced by continuously bringing together solution 1 and solution 2 with vigorous stirring at constant temperature and constant pH. The precipitate which is partly amorphous is further stirred for 45 minutes at 60° C and then filtered off and carefully washed until it is devoid of alkali. The purified precipitate is suspended in 14 liters of water and stirred for 4 hours at 60° C. The formation of the compound $Ni_5MgAl_2(OH)_{16}CO_3 \cdot 4H_2O$ is completed during this period. The product is filtered off and dried for 15 hours at 95° C and then calcined for 4 hours at 400° C, heating from the drying temperature to the calcination temperature being accomplished within 90 minutes. The calcined material thus formed is pelleted with an addition of 2% of graphite to give pellets having the dimensions 5 mm × 5 mm. A content of 54.3% by weight of Ni and 0.001% by weight of K is determined analytically in the oxidic catalyst.

EXAMPLE 2

Catalyst B:

The following 2-molar solutions are prepared for the production of $Ni_5MgAl_2(OH)_{16}CO_3 \cdot 4H_2O$:

Solution 1:
  0.463 kg of $Mg(NO_3)_2 \cdot 6H_2O$ is dissolved in water so that the volume of the solution is 0.9 liter.

Solution 2:
2.845 kg of $Ni(NO_3)_2 \cdot 6H_2O$ and
1.450 kg of $Al(NO_3)_3 \cdot 9H_2O$
are dissolved in water so that the volume of the solution is 7.0 liters.

Solution 3:
  1.85 kg of $Na_2CO_3$ is dissolved in 9 liters of water.
  2.5 liters of $H_2O$ is placed in a stirred vessel provided with a glass electrode for continuous pH measurement, heated to 50° C and adjusted to a pH of 10 with an appropriate amount of solution 3.

At a constant pH and a constant temperature magnesium is precipitated as hydroxide and as carbonate by continuously bringing solution 1 together with solution 3. After all solution 1 has flowed in the addition of solution 3 is discontinued.

The pH in the vessel is adjusted to 8 with a small amount of solution 2 and at this pH and at a temperature of 50° C the solutions 2 and 3 are continuously brought together within 40 minutes. The deposited partly crystalline precipitate is filtered off and carefully washed until devoid of alkali. The filter cake is suspended in 12 liters of water at 50° C and stirred for a long time. The further formation of the compound $Ni_5MgAl_2(OH)_{16}CO_3 \cdot 4H_2O$ may be followed by X-ray photography. After about 4 to 5 hours the precipitate is suction filtered, dried for 5 hours at 95° C and for 5 hours at 110° C and then calcined for 4 hours at 500° C, the heating up from the drying temperature to the calcination temperature being accomplished within 2 hours. Analysis shows 55.3% by weight of nickel and 0.003% by weight of sodium.

EXAMPLE 3

A comparative experiment is carried out under the conditions set out in Examples 1 and 2 of DAS 1,180,481, namely:

| | |
|---|---|
| temperature of catalyst | 500°C |
| preheating temperature of mixture | 450°C |
| pressure | 25 atmospheres |
| feedstock | light naphtha |
| ratio of steam to naphtha | 2 kg/kg | space velocity 0.5 kg of naphtha per liter of catalyst/hour.

The light naphtha used has a density of 0.693 g/ccm (at 20° C) and a boiling point range of from 63° to 102°

C. It contains 88% by volume of paraffins, 10% by volume of six-ring naphthenes and 2% by volume of aromatics. Nothing is said in Examples concerning the space velocity and therefore the above low velocity is chosen.

The catalysts used are three nickel BASF catalysts available commercially and suitable for high temperature steam cracking of hydrocarbons and the special catalyst containing 15% of nickel described in the cited DAS. The nickel content of the catalysts, the carrier of the same and the trade name in each case are given in the following Table:

| Type of catalyst | Ni% by wt | Carrier |
|---|---|---|
| G 1-11 | 6 | magnesite |
| G 1-21 | 16 | kaolin + magnesium oxide + aluminous cement |
| G 1-40 | 20 | magnesium oxide + alumina |
| $C_1$ prepared according to DAS 1,180,481; column 4, lines 29 et seq. | 15 | alumina |

The experiments are carried out in a reaction tube containing 270 ccm of the specified catalyst in each case.

The results of the experiments are given in the following Table: The abbreviations used are:

P = period in days.
B = at the beginning.
G 1-11 (G 1-21, G 1-40, $C_1$) = % by weight of naphtha reacted when using the catalyst G 1-11 (G 1-21), G 1-40 or $C_1$)

| P | G 1-11 | G 1-21 | G 1-40 | $C_1$ |
|---|---|---|---|---|
| B | 100.0 | 100.0 | 96.7 | 100 |
| 1 | 93.4 | 97.9 | 94.0 | 100 |
| 2 | 82.0 | 82.6 | 93.1 | 100 |
| 3 | 43.7 | 53.0 | 91.6 | 100 |
| 4 | — | 36.9 | 76.1 | 100 |
| 5 | — | 23.3 | 75.0 | 100 |
| 6 | 30.2 | 15.9 | — | 100 |
| 7 | 18.8 | 32.77 | 54.5 | 100 |
| 8 | 10.7 | — | — | 100 |
| 9 | — | 29.9 | 61.0 | 100 |
| 10 | — | — | 48.2 | 100 |
| 12 | — | — | 18.5 | 100 |
| 14 | — | — | 0 | 100 |

The experiments show that the process cannot be carried out with commercially available nickel cracking catalysts since all three catalysts are deactivated in a very short time. The experiment with the catalyst G 1-11 is stopped after 8 days at a conversion of only 11% by weight, that with the catalyst G 1-21 is stopped after 9 days at a conversion of 30% by weight. Since the experiment with the catalyst G 1-40 still showed a conversion of 61% by weight of naphtha after 9 days by which time the catalyst G 1-11 was completely deactivated and no longer converted any naphtha at all. This also shows that no stabilization of the catalyst takes place but that decrease in activity is progressive until the catalyst is completely deactivated in a very short time.

It will be seen from these experiments that nickel catalysts are plainly not suitable for the process of the cited DAS. It is only the special nickel catalyst with a pure alumina carrier prepared according to DAS 1,180,481 which proves to be suitable to a very limited extent; the experiment with this catalyst is also extended to 14 days. After this period the catalyst still completely converts naphtha but at a commercial space velocity of 1 kg of naphtha per liter of catalyst per hour complete cracking of naphtha is no longer possible with this catalyst (cf. Example 4).

Concerning the technique it may be stated that higher hydrocarbons were detected by gas chromatography down to 1 ppm.

EXAMPLE 4

Conditions of the experiment:

| | |
|---|---|
| catalyst temperature (Al block temperature max.) | 470°C |
| preheating temperature of the mixture | 420°C |
| pressure | 30 atmospheres |
| feedstock | naphtha |
| steam/naphtha ratio | 2 kg/kg |
| space velocity | 1 kg naphtha per liter of catalyst/hour. |

The naphtha used has a density of 0.728 g/ccm at 20° C and a boiling point range of from 80° to 150° C. It contains 62% by volume of paraffins, 34.5% by volume of naphthenes and 3.5% by volume of aromatics.

In these comparative experiments carried out in a reaction tube with 200 ml of catalyst in each case lower temperatures, a higher pressure, a naphtha of higher boiling point and particularly a higher space velocity are used than in Example 3. The results are collected in the following Table:

| Catalyst according to DAS 1,180,481 | | Nickel content by weight | Time until first breakthrough of naphtha |
|---|---|---|---|
| 1 | $C_1$ | 15 | from the start |
| 2 | $C_2$ | 24.9 | from the start |
| 3 | $C_3$ | 51.2 | after seven hours |

EXAMPLE 5

Catalyst E:

A catalyst precursor prepared according to Example 1 is immediately heated for 12 hours at 600° C in a preheated furnace and pressed into pellets of the dimensions 5 mm × 5 mm with an addition of 2% of graphite without observing any special precautions as regards drying and calcination (as described above).

EXAMPLE 6

Catalyst F:

A catalyst is prepared by precipitation in accordance with the description in DAS 1,227,603. After the precipitate has been filtered off, suspended six times in hot water, alkalized and dried at 100° C it is calcined at 450° C. The calcined material is then pressed into pellets of the dimensions 5 mm × 5 mm with an addition of 2% of graphite. Analysis of the oxidic catalyst gives the composition: 25.0% by weight of Ni, 65.4% by weight of $Al_2O_3$, 3.05% by weight of K.

EXAMPLE 7

Catalyst G:

The catalyst is prepared analogously to the description in Example 6 according to the directions in DAS 1,227,603. Analysis of the oxidic catalyst gives the composition: 61.4% by weight of Ni, 19.5% by weight of $Al_2O_3$, 1.31% by weight of K.

EXAMPLE 8

200 ml of catalyst A is placed in a rection tube having a diameter of 24 mm. The tube is heated externally by a block of aluminum. After the catalyst has been reduced at 450° C and 16 atmospheres absolute of hydrogen over 20 hours a desulfurized naphtha (density: 0.727 g/ccm; boiling point range from 80° to 155° C) is vaporized with the addition of 2 kg of water for each kg of naphtha and passed at a pressure of 30 atmospheres absolute through the catalyst with an entry temperature of 300° C. The space velocity is 2 kg of naphtha per liter of catalyst per hour. The temperature of the surrounding block of aluminum is kept at 350° C during the reaction. The reaction gas leaves the bed of catalyst at a temperature of 412° C. After unreacted water (0.528 kg/hour) has been condensed 672 liters (STP) per hour of a dry gas is obtained which has the following composition: 69.9% by volume of $CH_4$, 6.3% by volume of $H_2$, 0.1% by volume of CO and 23.7% by volume of $CO_2$.

EXAMPLE 9

200 ml of catalyst B is reduced in the reaction tube described in Example 8 and tested under the following experimental conditions: space velocity: 2 kg of naphtha (of the specification of Example 8) per liter of catalyst per hour; preheating temperature: 340° C; temperature of aluminum block: 390° C; ratio of water/naphtha: 2.0:1. The cracked gas leaving the bed of catalyst at 436° C is cooled. 0.53 kg of water and 685 liters (STP) per hour of a dry gas is obtained which contains 67.7% by volume of $CH_4$, 8.3% by volume of $H_2$, 0.2% by volume of CO and 23.8% by volume of $CO_2$.

EXAMPLE 10

Catalyst E is tested under the same conditions and in the same reactor as described in Example 8. The catalyst from the start does not show 100% conversion. A balance of used and unreacted naphtha condensed out gives an integral conversion over 20 hours of only 92%.

EXAMPLE 11

In order to compare their activity the catalysts A, B, $C_1$, $C_3$, F and G are tested under the following conditions: reaction tube as in Example 8, reduction for 20 hours at 450° C and hydrogen pressure of 16 atmospheres absolute; space velocity 5 kg of naphtha of the specification given in Example 8 per liter of catalyst per hour; ratio of water to naphtha 2.0 kg/kg; preheating temperature 380° C; aluminum block 450° C; pressure 30 atmospheres absolute. The comparative magnitude is the time, measured in hours, after which unreacted higher hydrocarbons occur in the cracked gas for the first time (shown as ordinates in the drawing). The results are given in the following Table in which Cat = catalyst Ni = content (% by weight) of nickel in oxidic catalyst K/Na = content (% by weight) of potassium or sodium in the oxidic catalyst Slip = first naphtha slip cccurs after the number of hours given Fts = from the start.

TABLE

| Cat | Ni | K/Na | Slip |
| --- | --- | --- | --- |
| A | 54.3 | 0.001 | 196 |
| B | 55.3 | 0.003 | 164 |
| $C_1$ | 15.0 | 0.01 | Fts |
| $C_3$ | 51.2 | 0.01 | Fts |
| F | 25.0 | 3.05 | Fts |
| G | 61.4 | 1.31 | 89 |

We claim:

1. A catalyst in the production of which the compound $Ni_5MgAl_2(OH)_{16} \cdot CO_3 \cdot 4H_2O$ is prepared as the catalyst precursor from aqueous solution, dried within the temperature range from 80° to 180° C, calcined within the range from 350° to 550° C and then reduced in a stream of hydrogen, the rise in temperature between the drying stage and the calcination stage being carried out with a gradient within the range from 1.66° C per minute to 3.33° C per minute.

2. A catalyst as claimed in claim 1 wherein the catalyst precursor is dried within the temperature range from 90° to 120° C and is calcined within the temperature range from 390° to 410° C.

* * * * *